United States Patent
Shirakawa

(10) Patent No.: US 6,230,028 B1
(45) Date of Patent: May 8, 2001

(54) SIMPLIFICATION OF PORTABLE RADIO TELEPHONE'S OPERATION

(75) Inventor: Hiroshi Shirakawa, San Diego, CA (US)

(73) Assignees: Sony Coporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/240,974

(22) Filed: Jan. 29, 1999

(51) Int. Cl.[7] .................................................. H04B 1/38
(52) U.S. Cl. ............................................. 455/566; 455/575
(58) Field of Search .................................. 455/550, 566, 455/567, 569, 575, 90; 379/428, 430, 433

(56) References Cited

U.S. PATENT DOCUMENTS 5,175,759 * 12/1992 Metroka et al. ..................... 455/575
5,584,054 * 12/1996 Tyneski et al. ...................... 455/566

OTHER PUBLICATIONS

"Motorola Unveils First 'Internet–Ready' Integrated Digital Wireless Handset," David Kurt, Motorola, New Orelans, LA, Feb. 8, 1999, Copyright 1997, from www.mot.com.

* cited by examiner

*Primary Examiner*—Thanh Cong Le
(74) *Attorney, Agent, or Firm*—Crosby, Heafey, Roach & May

(57) ABSTRACT

A portable radio telephone is provided with a body, keypad for entering telephone calling functions and data information and a display for displaying telephone functions and status. The portable radio telephone is also provided with a cover hinged to the telephone body for assuming a closed or open orientation. When closed, the telephone keypad and display are covered. The cover includes a transparent window for enabling the user to visibly observe the display when the cover is in a closed orientation.

2 Claims, 4 Drawing Sheets

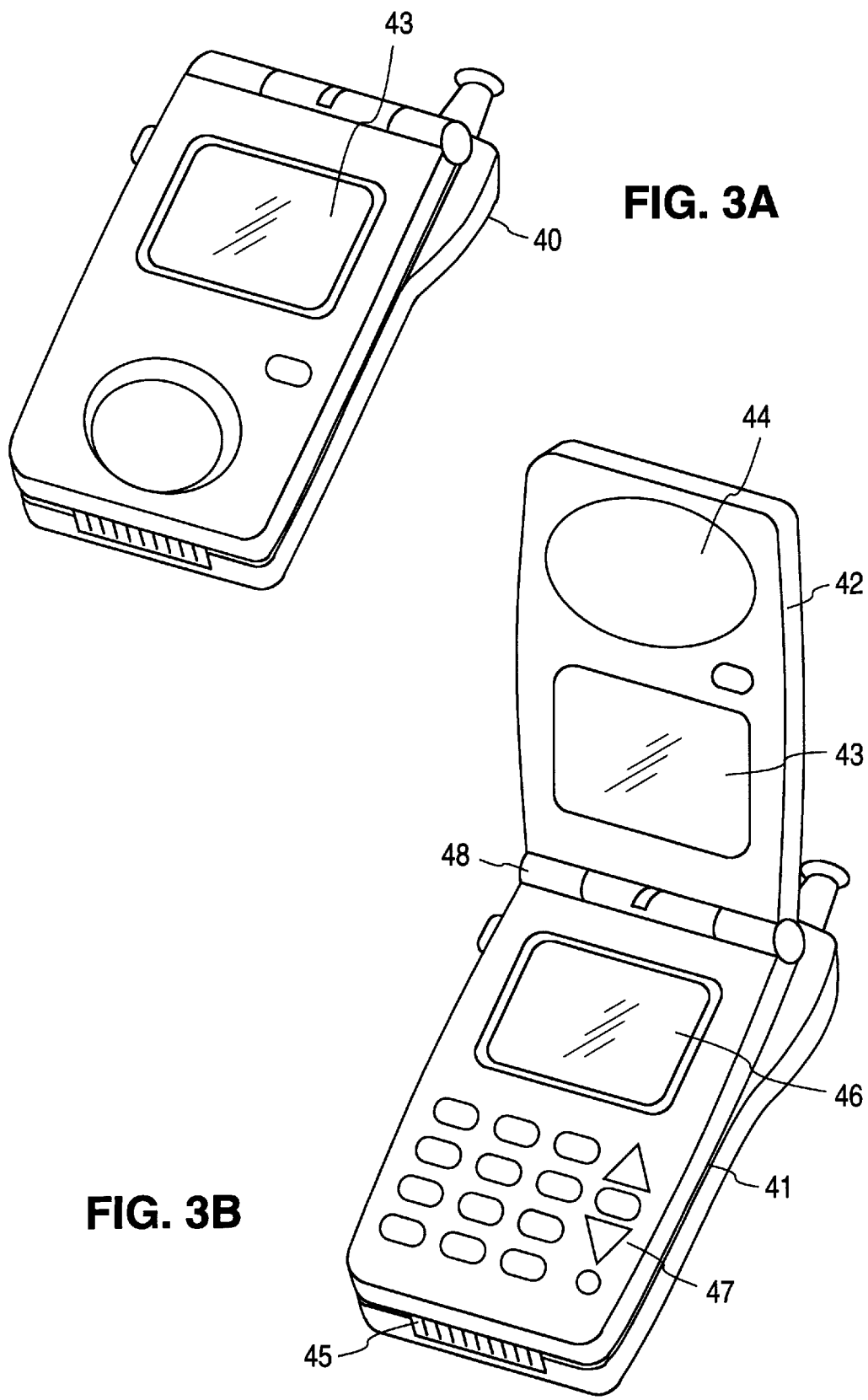

SIMPLIFICATION OF PORTABLE RADIO TELEPHONE'S OPERATION

FIELD OF INVENTION

The present invention is related to a portable radio telephone which includes a body, keypad for entering telephone calling and data information and a display in the form of, for example, a liquid crystal display (LCD). A cover is hinged to the body of the telephone for selectively assuming a closed or open orientation. When closed, the cover captures the keypad and display. The present invention provides for a cover which includes a transparent window for enabling the user to visually observe the display when the cover is in its closed orientation.

BACKGROUND OF THE INVENTION

Although at one time a novelty, today, wireless communication through the use of portable radio telephones is a widely accepted and, in fact, a commonplace means of communicating. Now that portable radio telephones are employed by virtually all population segments, the trend to make such devices smaller, lighter and more user friendly has taken center stage.

Clearly, the current trend is to produce portable radio telephones which are smaller and lighter than those previously offered. Phones by Motorola, Qualcomm and Ericsson have been reduced in size and weight, in part, through the use of hinged covers which not only offer keypad and LCD protection, but also reduce the distance between the microphone and speaker when the phone is not in use. Further, a hinged cover acts to prevent inadvertent activation when the portable radio telephone is either not in use or not on active status.

Although hinged covers offer certain functional advantages as noted above, such designs are not without their drawbacks. For example, a user would generally carry the portable radio telephone with the cover closed even if the phone has been activated to receive a call. However, because the cover obscures the LCD display, valuable information such as caller I.D. is not available to the user unless the hinged cover was opened. In most designs, opening of the cover acts to receive the call so that the option of avoiding a call based upon the caller I.D. display is lost to the user. Further, if one wished to use a jog dial to enter data or to scroll information contained within the portable radio telephone, one would again be required to flip the hinged cover from the telephone body in order to access the keypad and LCD.

Despite these drawbacks, the use of a hinged cover over the body of a portable radio telephone has become a universally acceptable design feature of the most modem of such devices. The hinged cover enables phones to be smaller than competitive phones created without this design feature. Besides the protective function provided by the hinged covers, auditory performance is also enhanced. In order to achieve adequate microphone performance, the microphone must be placed proximate the mouth of a user while the speaker is placed against the user's ear. Unless the hinged cover extends the microphone when the cover is drawn away from the telephone body, the microphone would simply not be in the appropriate position to pick up a user's voice during normal telephone operation. Some manufacturers have seen fit to take the approach of providing a microphone at the end of an extendable arm as a design alternative. However, this solution has not been well received because without the shielding provided by a hinged cover, background noise becomes an annoying intrusion.

It is thus an object of the present invention to provide a portable radio telephone employing a hinged cover which takes advantage of features that such a cover provides while substantially eliminating its drawbacks.

These and further objects of the present invention will be more readily appreciated when considering the following disclosure and appended claims.

SUMMARY OF THE INVENTION

The present invention is directed to a portable radio telephone having a body, a keypad for entering telephone calling and data information and a display for displaying telephone function and status information. The portable radio telephone of the present invention is further provided with a cover hinged to its body for selectively assuming a closed or open orientation. The cover is sized such that when it is closed, it covers the keypad and display of the portable radio telephone. The cover is further characterized as being provided with a transparent window for enabling the user to visually observe the display when the cover is in its closed orientation.

BRIEF DESCRIPTION OF THE DRAWINGS

FIGS. 3A and 3B illustrate a third embodiment of the present invention in perspective showing the portable radio telephone in both a closed and open orientation, respectively.

DETAILED DESCRIPTION OF THE INVENTION

Figures 1A, 1B:
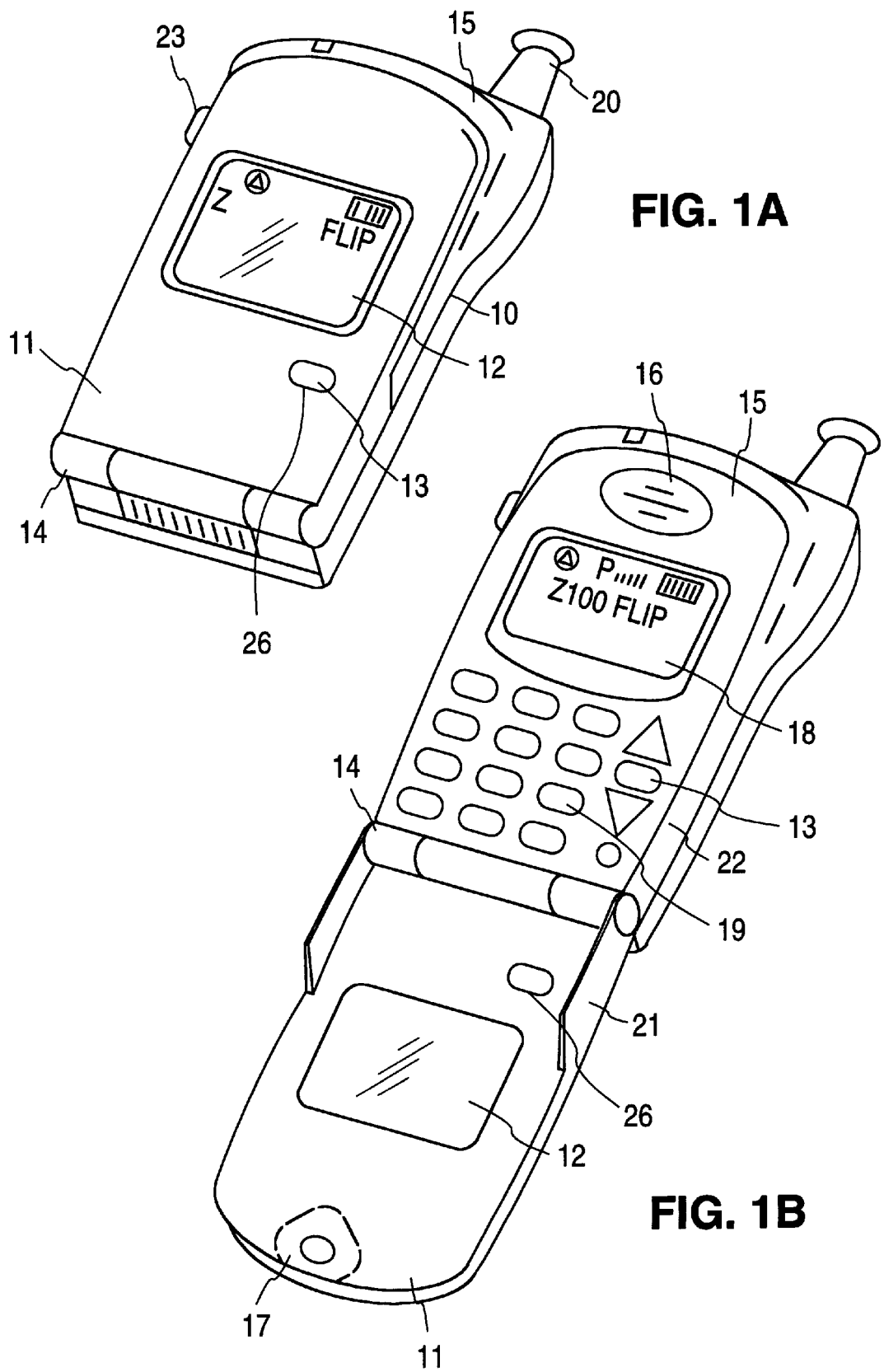
FIGS. 1A and 1B illustrate a first embodiment of the present invention in perspective showing the portable radio telephone in both a closed and open orientation.

Turning to FIGS. 1A and 1B, a first embodiment of the present invention is illustrated. Specifically, portable radio telephone 10 is shown having body 15, keypad 19 for entering telephone calling and data information to telephone 10 and display 18 for displaying telephone function and status information. Cover 11 is hinged at 14 to body 15 for selectively assuming a closed (FIG. 1A) or open (FIG. 1B) orientation with respect to body 15.

It is noted that when cover 11 is closed over body 15, keypad 19 and LCD display are also covered. However, as noted above, unlike prior devices of this type, cover 11 is provided with transparent window 12 for enabling the user to visually observe the LCD even when cover 11 is in its closed (FIG. 1A) orientation. Thus, the portable radio telephone of the present invention is provided with advantages inherent in the use of a hinged clamshell-like product of the prior art including the physical protection which a hinged cover inherently provides as well as ideal selective spacing between microphone 17 and speaker 16, but while allowing the user to observe LCD display 18 when cover 11 is in its closed orientation.

One of the design features of the present invention is to provide jog dial 23 and clear key 13 accessible to a user even when cover 11 is closed over body 15 through opening 26 in cover 11. As such, when the telephone has received a call, the user can, for example, observe the caller I.D. without having to swing cover 11 to an open position. Also the user can use jog dial 23 to scroll information programmed within the portable radio telephone and clear the display without having to, again, swing cover 11 from body 15.

As in portable radio telephones of the prior art, telephone 10 of the present invention is further provided with antenna 20 and, preferably, a means to receive a telephone call as cover 11 is moved to an open orientation as shown in FIG. 1B. Preferably, this is done by placing a Hall sensor at 22 and a magnet within cover 11 at 21. Obviously, the hall sensor can transduce a magnetic change into a voltage change resulting in a change in status of the subject portable radio telephone. As such, a call can be made by first recalling a phone number from the telephone memory or a call can be answered by merely swinging cover 11 to an open position. The call can be ended by swinging cover 11 closed.

Figures 2A, 2B:
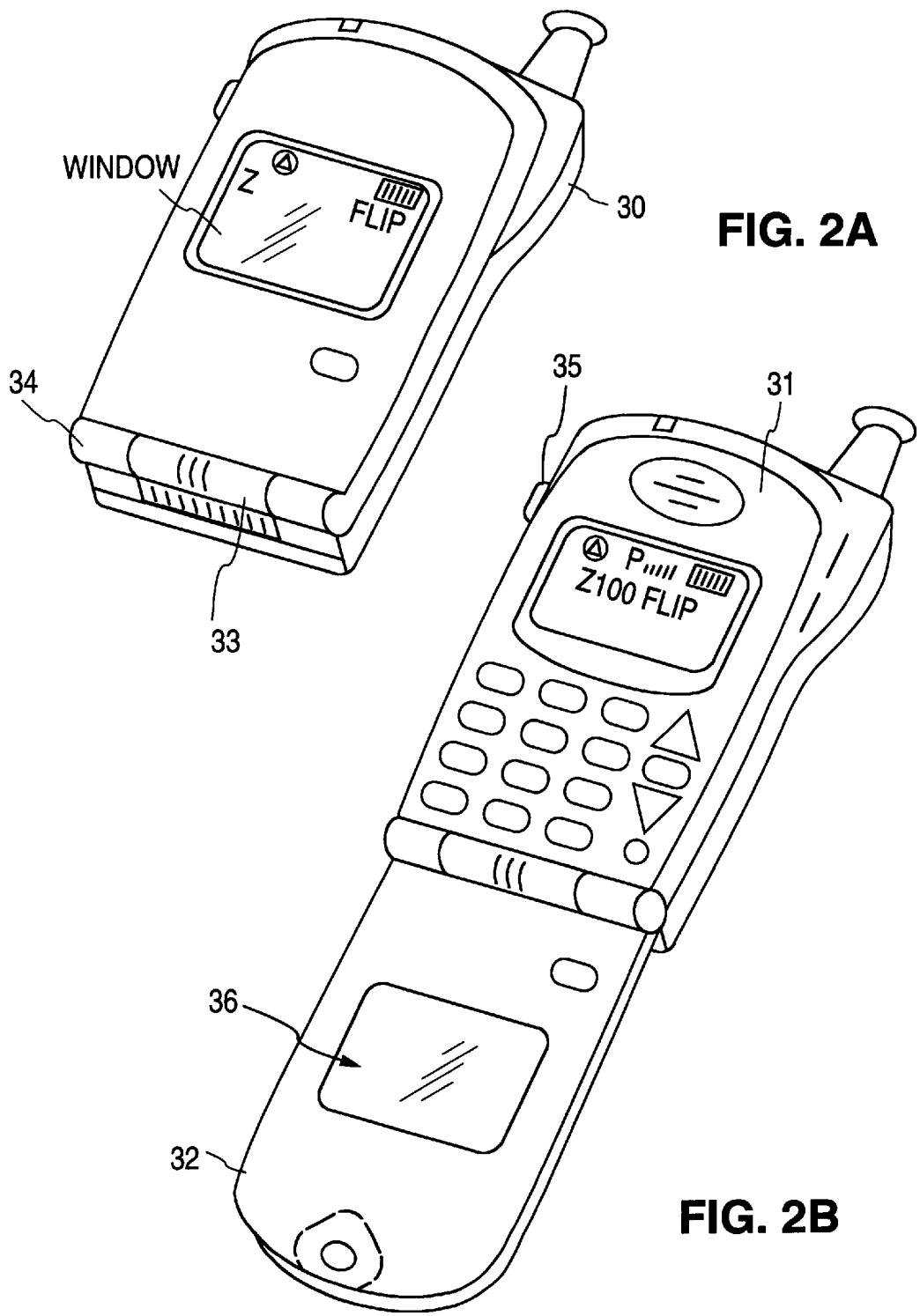
FIGS. 2A and 2B illustrate a second embodiment of the present invention in perspective showing the portable radio telephone in both a closed and open orientation, respectively.

An embodiment of the invention shown in FIG. 1 is illustrated in FIG. 2. In this instance, phone 30 is provided with cover 32 having transparent window 36 hinged to body 31 at 34. In this embodiment, cover 32 is not provided with a microphone. Instead, body 31 is provided with microphone 33 located proximate hinge 34. Unlike the embodiment shown in FIG. 1, that of FIG. 2 does not recognize the opening or closing of cover 32 as a means of changing the status of portable radio telephone 30. Instead, a user places a call by employing jog dial 35 and by providing a talk function in the phone book menu of the device. As such, a call can be placed and received without flipping cover 32 into an open orientation (FIG. 2B). Nevertheless, a user of such a device would oftentimes open cover 32 simply because in such an orientation, acoustic performance is enhanced for cover 32 acts to shield microphone 33 from unwanted ambient noise.

FIG. 3 illustrates yet another embodiment of the present invention. In this instance, portable radio telephone 40 again being provided with body 41 and cover 42 differs from prior embodiments in the placement of speaker 44 within cover 42 and microphone 45 within body 41. Cover 42 is further provided with transparent window 43 such that when cover 42 is rotated about hinge 48 and closed upon body 41, any information displayed by LCD 46 would appear through the transparent window 43. As in the embodiment shown in FIG. 1, portable radio telephone 40 can also be provided with the combination of a hall sensor and magnet so that the operation of the device can be controlled by opening and closing cover 42.

Unlike previous embodiments, the embodiment shown in FIGS. 3A and 3B provide for cover 42 which is hinged at the top of body 41 at hinge 48. In operation, a user would rotate cover 42 through hinge 48 placing cover 42 against his or her ear while speaking through microphone 45. One advantage in practicing the invention shown in FIGS. 3A and 3B is that the magnet employed in conjunction with speaker 44 can operate in conjunction with the hall sensor without requiring a second magnet for such operation. Also, because speaker 44 is removed from body 41, a portable radio telephone of predetermined dimension can have larger display 46 and keypad 47 than in practicing the embodiment shown in FIGS. 1 and 2.

Figure 4:
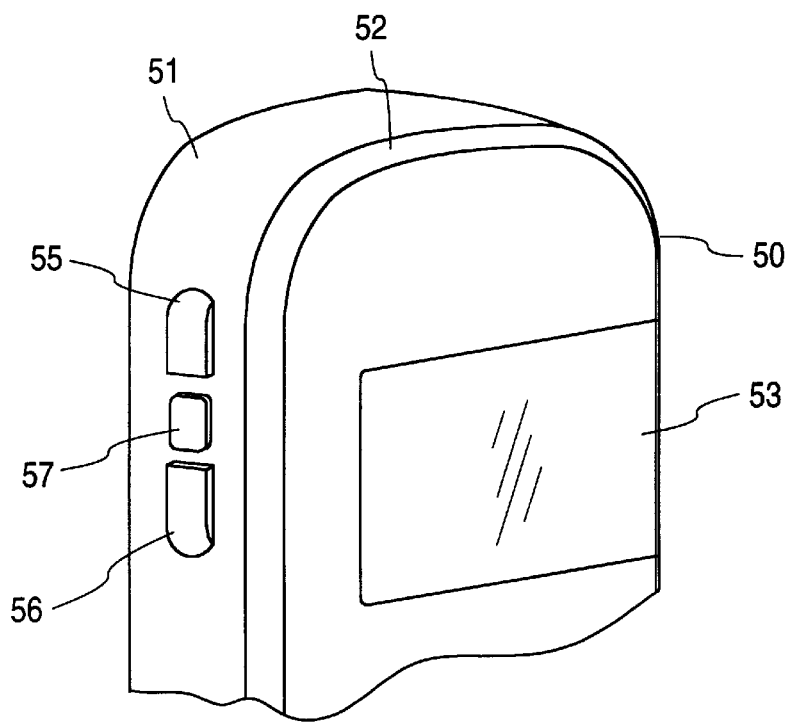
FIG. 4 is a perspective view of an embodiment of the present invention in which a jog dial is employed in place of or in addition to a keypad.

FIG. 4 illustrates yet a further embodiment of the present invention. In this instance, portable radio telephone 50 is provided with body 51 and hinged cover 52 again being configured with transparent window 53 for observing an LCD when cover 52 is in a closed orientation. In this embodiment, portable radio telephone 50 is provided with select key 57 and up and down keys 55 and 56, respectively. This embodiment can be used in conjunction with or in replacement of a standard keypad such as those shown in FIGS. 1 through 3. Note that a jog dial (not shown) could be used in place of the up and down keys 55 and 56 in alternative embodiments. In operation, a user merely selects a programmed function within portable radio telephone 50 with cover 52 in either a closed or open orientation.

Figure 5:
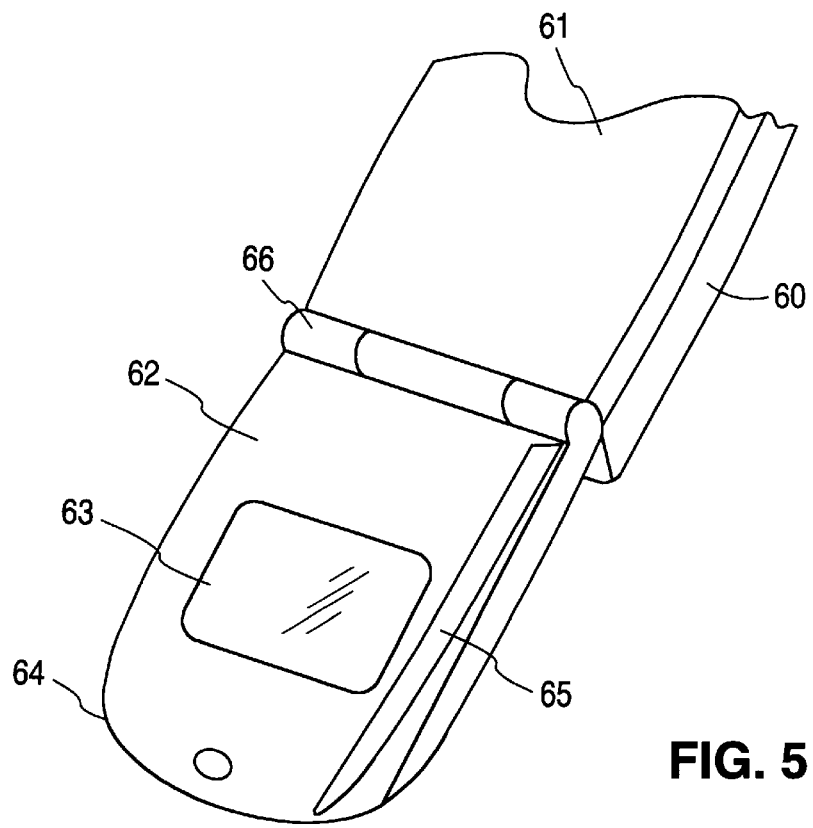
FIG. 5 is a perspective view of a further embodiment of the present invention in which an antenna has been configured within the hinged telephone cover.

Finally, FIG. 5 illustrates yet another embodiment of the present invention. In this instance, portable radio telephone 60 having body 61 is again provided with cover 62 rotatable about hinge 66. Cover 62 is configured with transparent window 63 and microphone 64 somewhat as depicted in FIG. 1. In this embodiment, antenna 65 is shown carried by cover 62. Alternatively, a patch antenna, in the form of a printed circuit board or a coiled helical antenna, could also be employed.

In summary, it is noted that the invention described above provides certain operating advantages when compared to prior art "flip phones" currently available. By practicing the present invention, a user can see a caller I.D., SMS, feature menus and other LCD displays without being required to swing the cover from the phone body. A user can also operate main telephone operations such as recalling memory and setting telephone parameters with a jog dial, again, without being required to open the cover. As such, one-hand operation is facilitated.

From a design standpoint, portable radio telephones produced pursuant to the present invention can be made to look more like pagers than "flip phones" in current usage. These phones can be made smaller than their present day counterparts noting that sizes approaching the dimensions of a cigarette box are readily achievable. All of this can be accomplished while providing superior acoustic performance by placing the microphone and speaker at ideal distances from one another approaching those of a desktop phone while the cover acts to reduce unwanted ambient noise.

Although the present invention has been shown and described with respect to further embodiments, various changes and modifications are deemed to lie within the spirit and scope of the invention as claimed. The corresponding structures, materials, acts and equivalents of all means or steps plus function elements in the claims which follow are intended to include any structure, material, or acts for performing the functions in combination with other claimed elements as specifically claimed.

What is claimed is:

1. In a portable radio telephone having a body, key pad for entering telephone calling and data information to said radio telephone and a display for displaying telephone functions and status information and further being provided with a cover hinged to said body for selectively assuming a closed or opened orientation with respect to said body which, when closed, covers said key pad in display, the improvement comprising configuring a transparent window within said cover for enabling a user to visibly observe said display when said cover is in its closed orientation, wherein the telephone functions can be executed when said cover is in a closed orientation, the status of said functions being visible through said transparent window, and wherein a jog dial is located on said body and accessible to a user when said cover is in a closed orientation, said jog dial enabling the user to access telephone functions, the status of which are visible through said transparent window in said cover.

2. In a portable radio telephone having a body and a display for displaying telephone functions and status information and further being provided with a cover hinged to said body for selectively assuming a closed or open orientation with respect to said body which, when closed covers said display, the improvement comprising configuring a transparent window within said cover for enabling the user to visually observe said display when said cover is in its closed orientation, wherein telephone functions and data information programmed within said telephone are accessed by a jog dial, said jog dial being located on the body of said telephone and accessible to a user when said cover is in a closed orientation.

* * * * *